(12) United States Patent
Sims et al.

(10) Patent No.: US 9,397,487 B2
(45) Date of Patent: Jul. 19, 2016

(54) SWITCHGEAR SYSTEM AND RESTRAINT ASSEMBLY THEREFOR

(71) Applicant: EATON CORPORATION, Cleveland, OH (US)

(72) Inventors: Daniel Garett Sims, Newberry, SC (US); Brad Robert Leccia, Bethel Park, PA (US)

(73) Assignee: EATON CORPORATION, Cleveland, OH (US)

( * ) Notice: Subject to any disclaimer, the term of this patent is extended or adjusted under 35 U.S.C. 154(b) by 14 days.

(21) Appl. No.: 14/508,057

(22) Filed: Oct. 7, 2014

(65) Prior Publication Data

US 2016/0099552 A1 Apr. 7, 2016

(51) Int. Cl.
*H02B 11/133* (2006.01)
*H02B 1/30* (2006.01)
*E05B 65/46* (2006.01)

(52) U.S. Cl.
CPC .............. *H02B 11/133* (2013.01); *E05B 65/46* (2013.01); *H02B 1/30* (2013.01)

(58) Field of Classification Search
CPC ...... H02B 11/00; H02B 11/12; H02B 11/127; H02B 11/133; H02B 5/00; H05K 7/1421; H01H 9/00; H01H 9/20; H01H 9/22

USPC ......... 361/600–610, 614–624, 627, 636, 652, 361/656; 200/43.01, 43.16, 43.19, 200/50.01–50.32, 85 B, 240, 241, 318, 321, 200/215, 605–610, 615
See application file for complete search history.

(56) References Cited

U.S. PATENT DOCUMENTS 2,762,879 A * 9/1956 Wills ..................... H01H 33/46
200/50.21
2,917,677 A * 12/1959 Washil ................. H02B 11/133
200/50.23

(Continued)

FOREIGN PATENT DOCUMENTS

JP 2014135835 A * 7/2014 ............... H02B 1/10
RU 002206163 C2 * 6/2003 ........... H02B 11/133

*Primary Examiner* — Michail V Datskovskiy
(74) *Attorney, Agent, or Firm* — Eckert Seamans Cherin & Mellott, LLC; Grant E. Coffield

(57) ABSTRACT

A restraint assembly is for a switchgear system. The switchgear system includes an enclosure having a number of compartments and a number of electrical apparatus, such as for example, circuit breakers, movable into and out of the compartments. The restraint assembly includes at least one latch assembly comprising a mounting member, a latch pivotably coupled to the mounting member, and a number of biasing elements biasing the latch. The latch moves between a latched position corresponding to the latch locking an electrical apparatus within a corresponding compartment, and an unlatched position corresponding to the electrical apparatus being movable with respect to the compartment. The biasing elements bias the latch toward the latched position.

20 Claims, 4 Drawing Sheets

(56) References Cited

U.S. PATENT DOCUMENTS

| | | | | | |
|---|---|---|---|---|---|
| 3,440,371 | A | * | 4/1969 | Stewart | H02B 11/133 200/38 FA |
| 3,710,044 | A | * | 1/1973 | Sharp | H02B 11/127 200/50.25 |
| 4,004,113 | A | * | 1/1977 | Ericson | H02B 11/133 200/50.25 |
| 4,412,112 | A | * | 10/1983 | Ishikawa | H04B 11/127 200/50.21 |
| 4,486,814 | A | * | 12/1984 | Ishikawa | H04B 11/127 200/50.23 |
| 5,309,317 | A | * | 5/1994 | Ishikawa | H05K 7/1421 200/325 |
| 6,005,208 | A | * | 12/1999 | Castonguay | H02B 11/10 200/308 |
| 6,031,192 | A | * | 2/2000 | Liebetruth | H02B 11/133 200/50.21 |
| 6,590,170 | B1 | * | 7/2003 | Jenkins | H02B 11/127 200/50.21 |
| 7,057,123 | B1 | * | 6/2006 | Jenkins | H02B 11/133 200/50.23 |
| 8,383,970 | B2 | * | 2/2013 | Pawar | H02B 11/127 200/50.21 |
| 8,891,229 | B2 | * | 11/2014 | Fischer-Carne | H02B 11/127 200/50.23 |

* cited by examiner

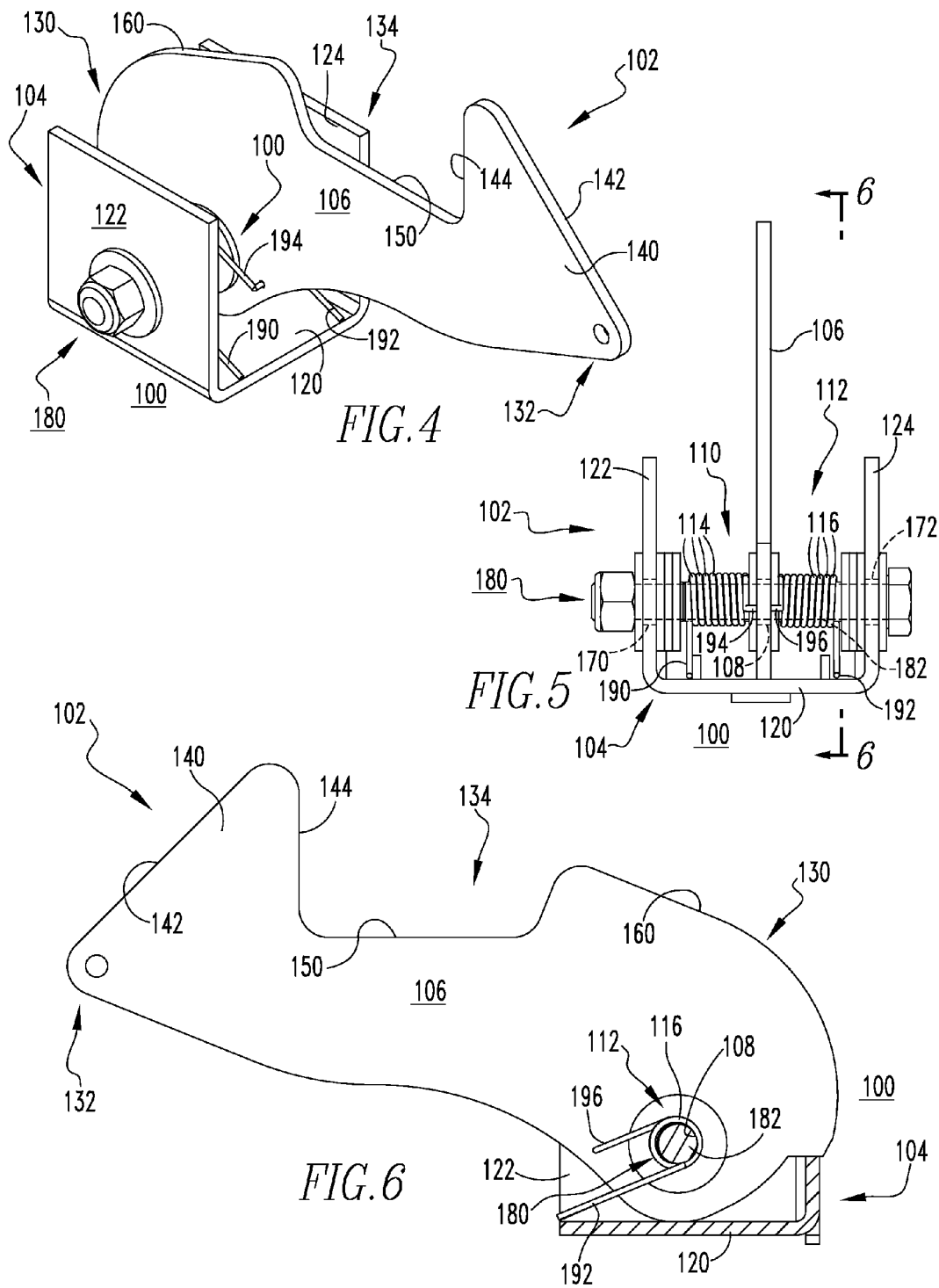

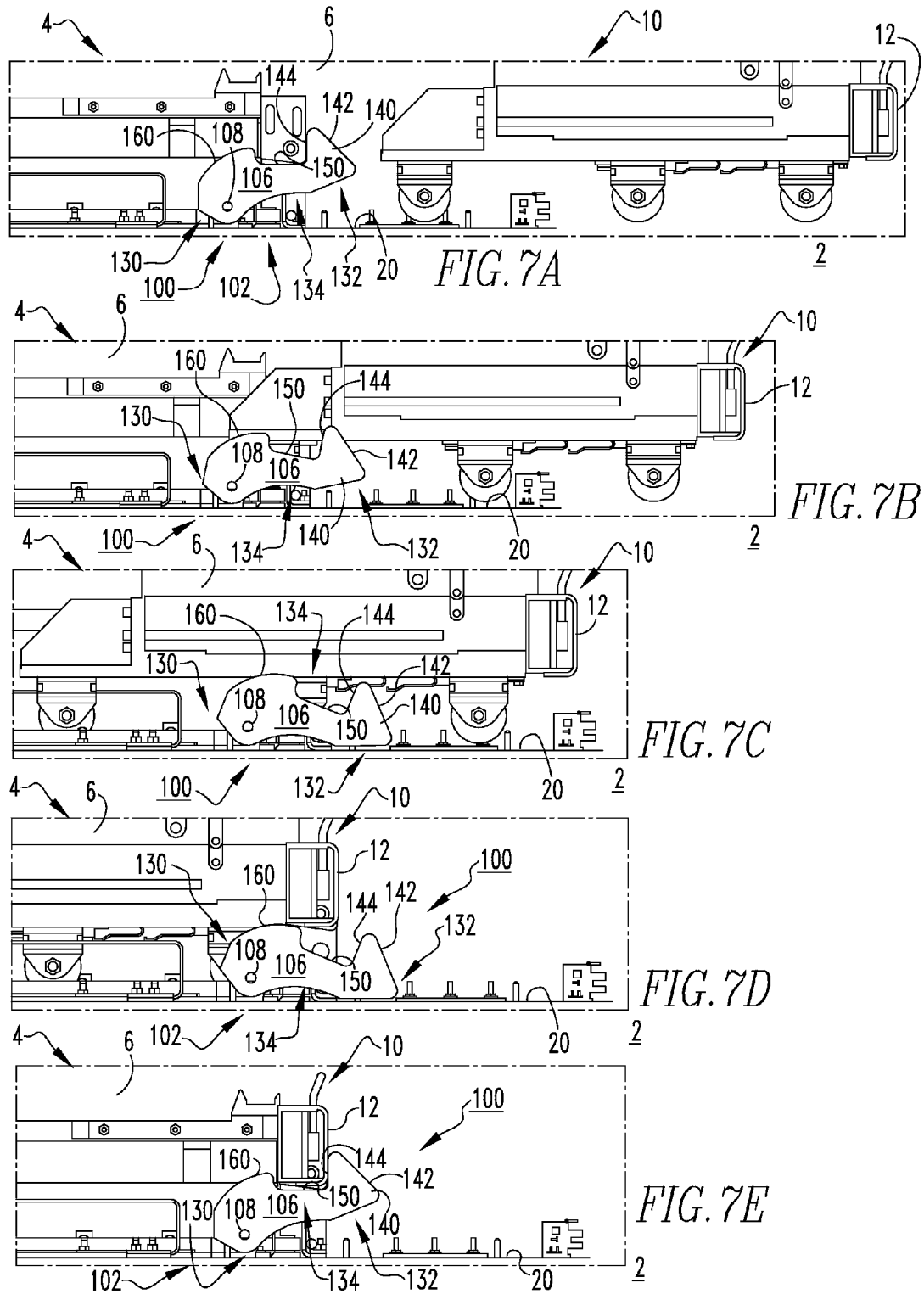

SWITCHGEAR SYSTEM AND RESTRAINT ASSEMBLY THEREFOR

BACKGROUND

1. Field

The disclosed concept relates generally to electrical systems and, more particularly, to electrical systems such as, for example, switchgear systems. The disclosed concept also relates to restraint assemblies for switchgear systems.

2. Background Information

Electrical switching apparatus used in power distribution systems are often mounted within a switchgear enclosure either individually or in combination with other switchgear (e.g., without limitation, circuit switching devices and circuit interrupters such as circuit breakers, contactors, motor starters, motor controllers and other load controllers).

Some electrical switching apparatus such as, for example, some medium-voltage and low-voltage circuit breakers, can be relatively large. In order to facilitate movement (e.g., installation; removal; maintenance), some circuit breakers are commonly coupled to draw-out mechanisms which permit such circuit breakers to be drawn out of a corresponding compartment or cell of the switchgear enclosure. Accordingly, such circuit breakers are commonly known in the art as "draw-out" circuit breakers. The draw-out circuit breaker can be drawn (e.g., racked) into and out of a connected position wherein the primary disconnect contacts of each circuit breaker pole engage with the mating stabs at the rear of the cell. Racking into the connected position is typically accomplished with a manually or electrically rotated jackscrew, worm gear, or other known or suitable mechanism.

Arc-resistant switchgear (e.g., draw-out circuit breakers) must be designed to withstand the high pressure explosion of superheated gasses and vaporized components associated with an arc event. Specifically, if the circuit breaker is not adequately secured, such high pressure could unintentionally and undesirably eject the circuit breaker from its corresponding switchgear enclosure compartment or cell. It is desirable to suitably secure the circuit breaker with respect to the switchgear enclosure to avoid this scenario.

There is, therefore, room for improvement in switchgear systems and in restraint assemblies therefore.

SUMMARY

These needs and others are met by embodiments of the disclosed concept, which are directed to a restraint assembly for switchgear systems.

As one aspect of the disclosed concept, a restraint assembly is provided for a switchgear system. The switchgear system comprises an enclosure having a compartment and an electrical apparatus movable into and out of the compartment. The restraint assembly comprises: at least one latch assembly comprising a mounting member, a latch pivotably coupled to the mounting member, and a number of biasing elements biasing the latch. The latch is structured to move between a latched position corresponding to the latch locking the electrical apparatus within the compartment, and an unlatched position corresponding to the electrical apparatus being movable with respect to the compartment. The number of biasing elements bias the latch toward the latched position.

As another aspect of the disclosed concept, a switchgear system comprises: an enclosure having a compartment; an electrical apparatus including a housing, the electrical apparatus being movable into and out of the compartment; and a restraint assembly comprising: at least one latch assembly comprising a mounting member, a latch pivotably coupled to the mounting member, and a number of biasing elements biasing the latch. The latch is movable between a latched position corresponding to the latch locking the electrical apparatus within the compartment, and an unlatched position corresponding to the electrical apparatus being movable with respect to the compartment. The number of biasing elements bias the latch toward the latched position.

BRIEF DESCRIPTION OF THE DRAWINGS

A full understanding of the disclosed concept can be gained from the following description of the preferred embodiments when read in conjunction with the accompanying drawings in which:

FIG. 4 is an isometric view of the portion of the restraint assembly of FIG. 3;

FIG. 5 is an end elevation view of the portion of the restraint assembly of FIG. 4;

FIG. 6 is a section view taken along line 6-6 of FIG. 5; and

FIGS. 7A-7E are side elevation views showing the restraint assembly in sequential positions in cooperation with a draw-out circuit breaker to restrain the circuit breaker with a switchgear system enclosure, in accordance with an embodiment of the disclosed concept.

DESCRIPTION OF THE PREFERRED EMBODIMENTS

Figure 1:
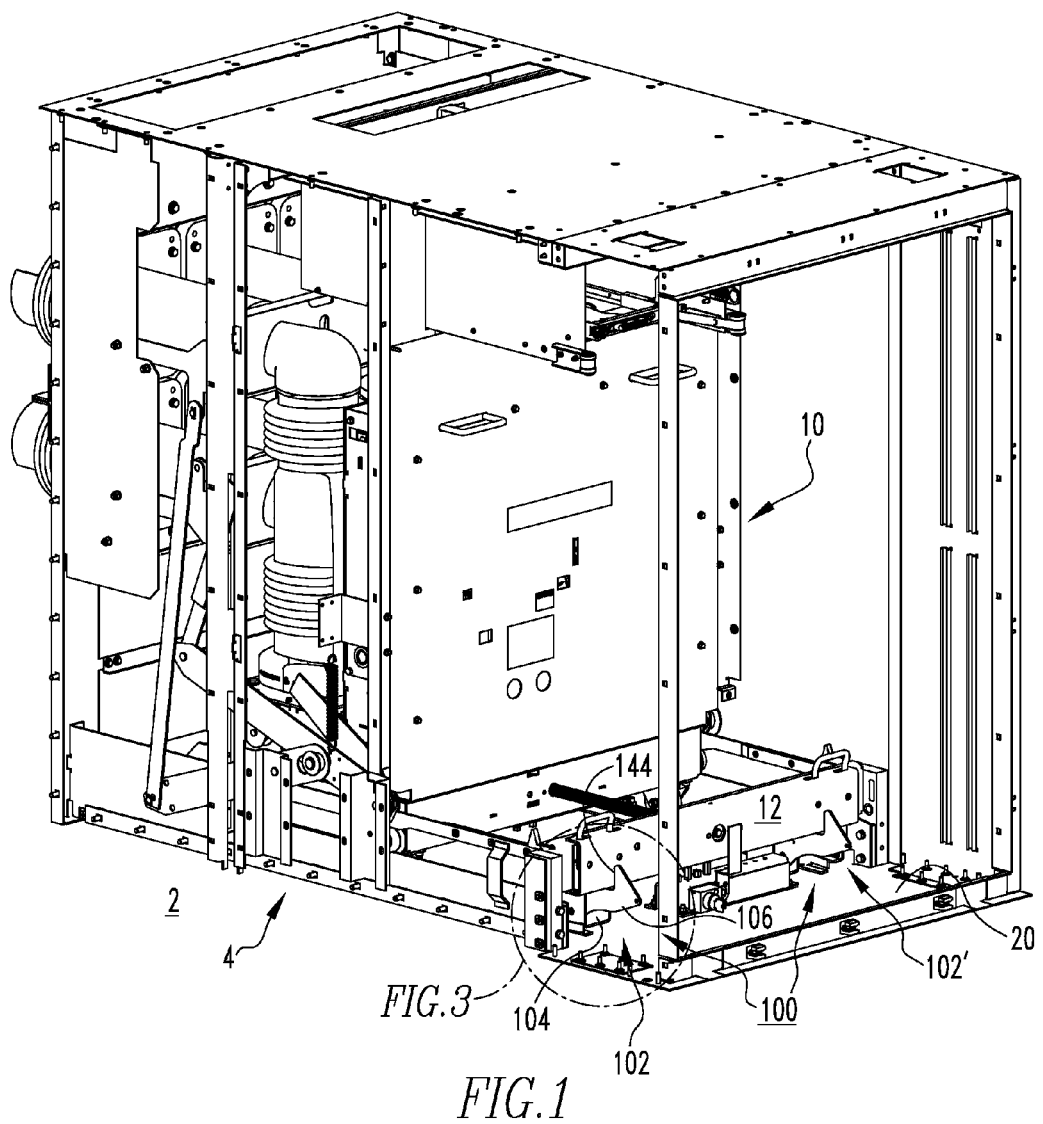
FIG. 1 is an isometric view of a switchgear system and restraint assembly therefore, in accordance with an embodiment of the disclosed concept.

Directional phrases used herein, such as, for example, left, right, clockwise, counterclockwise, front, back, top, bottom, upper, lower and derivatives thereof, relate to the orientation of the elements shown in the drawings and are not limiting upon the claims unless expressly recited therein.

As employed herein, the terms "fastener" and "fastener component" refer to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 shows a restraint assembly 100 for a switchgear system 2 and, in particular, for restraining (e.g., securing) an electrical switching apparatus such as, for example and without limitation, a draw-out circuit breaker 10, with respect to a corresponding compartment or cell 6 of a switchgear system enclosure 4 (shown in FIG. 1 with portions removed to show hidden structures). In other words, the disclosed concept is intended to provide a mechanism for restraining (e.g., without limitation, prohibiting) undesired movement of the circuit breaker 10 with respect to the compartment 6 of the switchgear system enclosure 4. For example and without limitation, for arc-resistant switchgear, it is necessary to restrain the switchgear to avoid undesired movement that would otherwise be caused by the excessive forces associated with an arc event. It will be appreciated that while the switchgear system 2 shown and described herein includes an enclosure 4 having a single compartment 6 and a single electrical apparatus 10 (e.g., without limitation, circuit breaker) movable into and out of such compartment 6, the disclosed concept could be employed with any known or suitable alternative type and/or configuration of switchgear system (not shown) having any known or suitable alternative number and/or configuration of compartments (not shown) and/or electrical apparatus (not shown).

Figure 2:
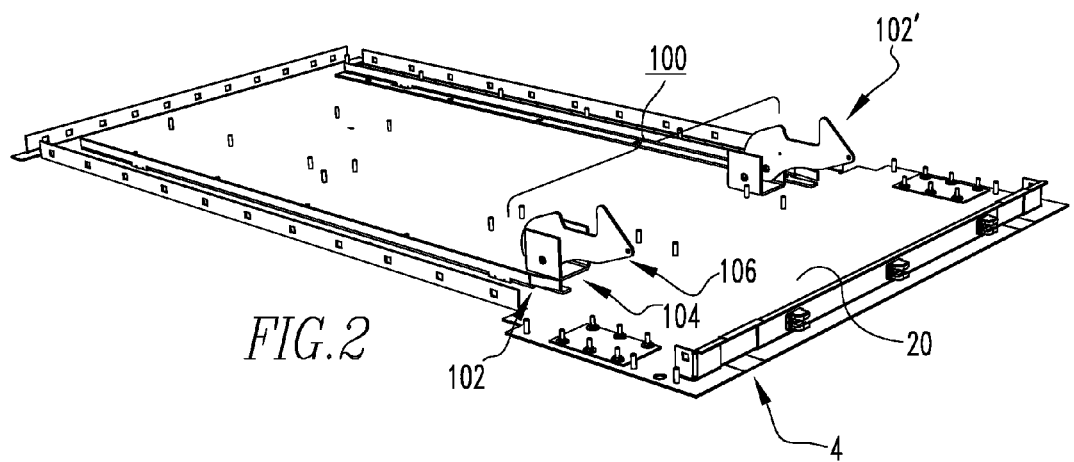
FIG. 2 is an isometric view of a portion of the switchgear system and restraint assembly therefore of FIG. 1.
Figure 3:
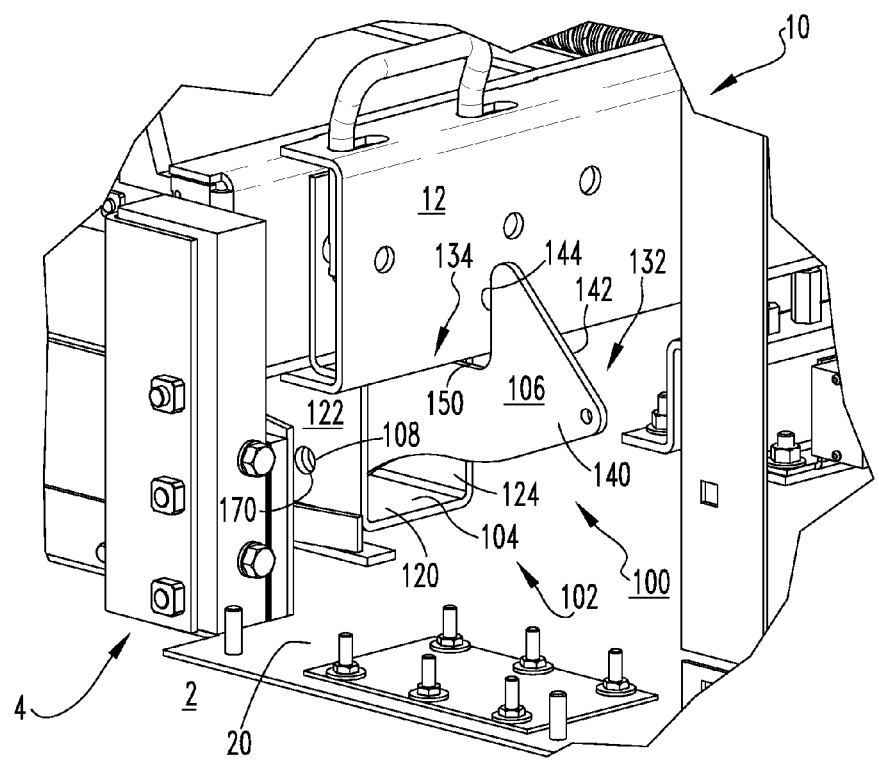
FIG. 3 is an enlarged isometric view of a portion of the switchgear system and restraint assembly therefore of FIG. 1.

Continuing to refer to FIG. 1, and also to FIGS. 2 and 3, the disclosed restraint assembly 100 includes at least one latch assembly 102,102' (two are shown in FIGS. 1 and 2). For ease of illustration and economy of disclosure, only latch assembly 102 will be shown and described in detail herein. It will be appreciated, however, that the other latch assembly 102' is preferably substantially identical.

As best shown in FIGS. 3-6, each latch assembly 102 includes a mounting member 104, a latch 106 pivotably coupled to the mounting member 104, and a number of biasing elements 110,112 (see, for example and without limitation, the first and second torsion springs 110,112, shown in FIG. 5). As will be discussed in greater detail hereinbelow, the latch 106 is structured to move between a latched position (FIGS. 1, 3 and 7E) corresponding to the latch 106 locking the electrical apparatus 10 within the compartment 6, and an unlatched position (see, for example, FIGS. 7C and 7D), corresponding to the electrical apparatus 10 being movable with respect to the compartment 6 (i.e., movable into (e.g., to the left from the perspective of FIGS. 7A-7E) and out of (e.g., to the right from the perspective of FIGS. 7A-7E) the compartment 6). The aforementioned biasing elements 110,112 (both shown in FIG. 5) bias the latch 106 toward the latched position.

As best shown in FIGS. 4 and 5, the example mounting member is a generally U-shaped bracket 104 having a base 120, a first sidewall 122 extending perpendicularly upwardly form the base 120, and a second sidewall 124 extending perpendicularly upwardly from the base 120 opposite and spaced apart from the first sidewall 122. The latch 106 is preferably pivotably coupled to the U-shaped bracket 104 between the first and second sidewalls 120,122.

The latch 106 includes first and second opposing ends 130,132 and an intermediate portion 134 extending therebetween. The first end 130 is disposed between the first and second sidewalls 122,124 of the generally U-shaped bracket 104, and the second end 132 extends outwardly away from the generally U-shaped bracket 104, as shown in FIGS. 4 and 6. Thus, it will be appreciated that the latch 106 is structured to pivot (e.g., without limitation, rotate clockwise and counter-clockwise) with respect to the generally U-shaped bracket 104. The base 120 of the generally U-shaped bracket 104 is suitably coupled to a base plate 20 of the switchgear system enclosure 4, as shown in FIGS. 1, 2 and 7A-7E. The example restraint assembly 100 includes two latch assemblies 102, 102' (both shown in FIG. 2). It will, however, be appreciated that any known or suitable alternative number and/or configuration of latch assemblies (not shown) could be employed, without departing from the scope of the disclosed concept.

Accordingly, it will be appreciated that the latch assembly 102 and, in particular, the latch 106 thereof, is structured to cooperate with the housing 12 of the electrical apparatus 10, when the electrical apparatus 10 is moved with respect to (i.e., into (e.g., to the left from the perspective of FIGS. 7A-7E) and out of (e.g., to the right from the perspective of FIGS. 7A-7E) the corresponding compartment 6 of the switchgear system enclosure 4. In this manner, as will now be described in greater detail, the disclosed restraint assembly 100 functions to allow movement of the electrical apparatus 10 or to restrain movement of the electrical apparatus 10, as desired. To accomplish this objective, namely to control movement of the electrical apparatus 10 and, in particular, restrain the electrical apparatus 10 against undesirable removal or ejection from the switchgear system enclosure 4, the latch 106 has a predetermined geometry structured to cooperate with the housing 12 of the electrical apparatus 10 in a predetermined manner.

The second end 132 of the example latch 106 includes a hook 140. The predetermined geometry of the hook 140, in the example shown and described herein, includes an inclined edge 144 and a restraining edge 146. The inclined edge 144 is structured to be engaged by the housing 12 of the electrical apparatus 10 to pivot the latch 106, against the bias of the biasing elements 110,112 (both shown in FIG. 5), toward the unlatched position. This will be further appreciated with reference to the sequential steps of FIGS. 7A-7E, showing movement of the electrical apparatus 10 into the compartment 6 of the switchgear system enclosure 4. In FIG. 7A, the electrical apparatus 10 is completely outside of the corresponding compartment 6. In FIG. 7B, the electrical apparatus 10 has begun to move into the compartment 6 and has engaged the spring-loaded latch 106. In particular, the housing 12 of the electrical apparatus 10 has engaged the inclined surface 142 of the aforementioned hook 140, causing the latch to pivot (e.g., rotate clockwise from the perspective of FIGS. 7A-7E), against the bias of the aforementioned torsion springs 110,112 (both shown in FIG. 5), toward the unlatched position (FIGS. 7C and 7D). Finally, in FIG. 7E, the electrical apparatus 10 is fully installed and locked (i.e., restrained) in position by the disclosed restraint assembly 100.

The intermediate portion 134 of the example latch 106 includes a recess 150, and the predetermined geometry of the first end 130 of the latch 106 preferably comprises an arcuate profile 160. Thus, in operation, responsive to the electrical apparatus 10 being moved into the compartment 6 toward the fully installed position of FIG. 7E, the arcuate profile 160 engages the housing 12 of the electrical apparatus 10 to controllably pivot (e.g., rotate clockwise from the perspective of FIGS. 7A-7E) the latch 106 to the unlatched position (FIGS. 7C and 7D). When the electrical apparatus 10 is fully installed, the arcuate profile 106 disengages the housing 12, thereby releasing the latch 106 to return to the latched position of FIG. 7E. That is, the spring-bias of the aforementioned torsion springs 110,112 functions to automatically bias the latch 106 toward the latched position. Accordingly, when the electrical apparatus 10 is fully installed and the latch 106 is disposed in the latched position, the recess 150 of the latch 106 receives a portion of the electrical apparatus housing 12 and the restraining edge 144 of the hook 140 engages the housing 12 to restrain movement of the electrical apparatus 10, as best shown in FIGS. 7E (see also FIGS. 1 and 3).

As shown in FIG. 5, the latch 106 of the example restraint assembly 100 includes a thru hole 108 (shown in hidden line drawing in FIG. 5; see also FIGS. 3, 6 and 7A-7E), and the first and second sidewalls 122,124 include apertures 170,172 (shown in hidden line drawing in FIG. 5), respectively. The latch assembly 102 further includes a fastener assembly 180 having an elongated pivot member 182 (e.g., without limitation, elongated bolt). The elongated bolt 182 extends through the aperture 170 of the first sidewall 122, through the thru hole 108 of the latch 106 and the plurality of coils 114,116 of the torsion springs 110,112, respectively, and finally through the aperture 172 of the second sidewall 124. The elongated bolt 182 thus fastens the assembly to the first and second sidewalls 122,124. It will be appreciated that the example fastener assembly 180 includes a number of washers and other fasteners or fastener elements (e.g., without limitation, a nut). The specific type, number and/or configuration of such fasteners or fastening components is not intended to be a limiting aspect of the disclosed concept. That is, any known or suitable alternative number, type and/or configuration of bolts, washers and/or nuts (not shown), or other suitable fasteners, could be employed (not shown), without departing from the scope of the disclosed concept.

Continuing to refer to FIG. 5, it will be appreciated that the example restraint assembly 100 includes a first torsion spring 110 disposed between the first sidewall 122 and the latch 106, and a second torsion spring 112 disposed on the opposite side of the latch 106, between a second sidewall 122 and the latch 106. Each torsion spring 110,112 also respectively includes a first leg 190,192 and a second leg 194,196.

The first leg 190 of the first torsion spring 110 cooperates with the base 120 of the generally U-shape bracket 104, and the second leg 194 cooperates with the latch 106. Similarly, the first leg 192 of the second torsion spring 112 cooperates with the base 120 of the generally U-shape bracket 104, and the second leg 196 of the second torsion spring 112 cooperates with the latch 106, as shown. In the example of FIGS. 4-5, the second legs 194,196 extend into corresponding openings in the latch 106.

Accordingly, the disclosed restraint assembly 100 provides an effective mechanism for controlling movement of an electrical apparatus 10 with respect to an enclosure of a switchgear system and, in particular, for maintaining the electrical apparatus 10 in a restrained (e.g., locked), fully installed position within the compartment 6 of the switchgear system enclosure 4. In this manner, the disclosed restraint assembly 100 effectively avoids undesirable movement (e.g., without limitation, ejection otherwise caused by the explosive forces associated with an arc event) of the electrical apparatus 10.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A restraint assembly for a switchgear system, said switchgear system comprising an enclosure having a compartment and an electrical apparatus movable into and out of said compartment, said restraint assembly comprising:
at least one latch assembly comprising a mounting member, a latch pivotably coupled to said mounting member, and a number of biasing elements biasing said latch, wherein said latch is structured to move between a latched position corresponding to said latch locking said electrical apparatus within said compartment, and an unlatched position corresponding to said electrical apparatus being movable with respect to said compartment; wherein said number of biasing elements bias said latch toward the latched position; wherein said mounting member is a generally U-shaped bracket; wherein said generally U-shaped bracket includes a base, a first sidewall extending perpendicularly upwardly from said base, and a second sidewall extending perpendicularly upwardly from said base opposite and spaced apart from said first sidewall; and wherein said latch is pivotably coupled to said U-shaped bracket between said first sidewall and said second sidewall.

2. The restraint assembly of claim 1 wherein said latch comprises a first end, a second end disposed opposite and distal from the first end, and an intermediate portion extending between the first end and the second end; wherein the first end is disposed between said first sidewall and said second sidewall; and wherein the second end extends outwardly away from said generally U-shaped bracket.

3. The restraint assembly of claim 2 wherein said electrical apparatus includes a housing; and wherein said latch has a predetermined geometry structured to cooperate with the housing of said electrical apparatus in order to allow movement of said electrical apparatus or to restrain movement of said electrical apparatus as desired.

4. The restraint assembly of claim 3 wherein the second end of said latch comprises a hook; wherein the predetermined geometry of said hook includes an inclined edge and a restraining edge; and wherein the inclined edge is structured to be engaged by the housing of said electrical apparatus to pivot said latch toward the unlatched position.

5. The restraint assembly of claim 4 wherein the intermediate portion of said latch includes a recess; wherein the predetermined geometry of the first end of said latch comprises an arcuate profile; wherein, responsive to said electrical apparatus being moved into said compartment toward a fully installed position, said arcuate profile is structured to engage the housing of said electrical apparatus to pivot said latch to the unlatched position; wherein, when said electrical apparatus is fully installed, said arcuate profile is structured to disengage the housing, thereby releasing said latch to return to the latched position; and wherein, when said electrical apparatus is fully installed and said latch is disposed in the latched position, said recess is structured to receive a portion of the housing of said electrical apparatus and said restraining edge of said hook is structured to engage the housing to restrain movement of said electrical apparatus.

6. The restraint assembly of claim 2 wherein the first end of said latch includes a thru hole; wherein said first sidewall and said second sidewall each include an aperture; wherein said latch assembly further comprises a fastener assembly; wherein said number of biasing elements is a number of torsion springs each including a plurality of coils; wherein said fastener assembly includes an elongated pivot member; wherein said elongated pivot member extends through the aperture of said first sidewall, through said thru hole of said latch and said plurality of coils, and through said aperture of said second sidewall; and wherein said fastener assembly fastens said elongated pivot member to said first sidewall and said second sidewall.

7. The restraint assembly of claim 6 wherein said number of torsion springs is first torsion spring and a second torsion spring; wherein said first torsion spring is disposed between said latch and said first sidewall; wherein said second torsion spring is disposed between said latch and said second sidewall; wherein each of said first torsion spring and said second torsion spring includes a first leg and a second leg; wherein said first leg cooperates with the base of said U-shaped bracket; and wherein the second leg cooperates with said latch.

8. The restraint assembly of claim 1 wherein said compartment includes a base plate; and wherein said at least one latch assembly is structured to be coupled to said base plate.

9. The restraint assembly of claim 8 wherein said at least one latch assembly is a first latch assembly and a second latch assembly.

10. A switchgear system comprising:
an enclosure having a compartment;
an electrical apparatus including a housing, said electrical apparatus being movable into and out of said compartment; and
a restraint assembly comprising:
 at least one latch assembly comprising a mounting member, a latch pivotably coupled to said mounting member, and a number of biasing elements biasing said latch,
 wherein said latch is movable between a latched position corresponding to said latch locking said electrical apparatus within said compartment, and an unlatched position corresponding to said electrical apparatus being movable with respect to said compartment,
 wherein said number of biasing elements bias said latch toward the atched position, and
 wherein, when said latch is in the latched position, said latch engages said housing in order to restrain movement of the electrical apparatus.

11. A switchgear system comprising:
an enclosure having a compartment;
an electrical apparatus including a housing, said electrical apparatus being movable into and out of said compartment; and
a restraint assembly comprising:
 at least one latch assembly comprising a mounting member, a latch pivotably coupled to said mounting member, and a number of biasing elements biasing said latch,
 wherein said latch is movable between a latched position corresponding to said latch locking said electrical apparatus within said compartment, and an unlatched position corresponding to said electrical apparatus being movable with respect to said compartment; wherein said number of biasing elements bias said latch toward the latched position; wherein said mounting member is a generally U-shaped bracket; wherein said generally U-shaped bracket includes a base, a first sidewall extending perpendicularly upwardly from said base, and a second sidewall extending perpendicularly upwardly from said base opposite and spaced apart from said first sidewall; and wherein said latch is pivotably coupled to said U-shaped bracket between said first sidewall and said second sidewall.

12. The switchgear system of claim 11 wherein said latch comprises a first end, a second end disposed opposite and distal from the first end, and an intermediate portion extending between the first end and the second end; wherein the first end is disposed between said first sidewall and said second sidewall; and wherein the second end extends outwardly away from said generally U-shaped bracket.

13. The switchgear system of claim 12 wherein said electrical apparatus includes a housing; and wherein said latch has a predetermined geometry structured to cooperate with the housing of said electrical apparatus in order to allow movement of said electrical apparatus or to restrain movement of said electrical apparatus as desired.

14. The switchgear system of claim 13 wherein the second end of said latch comprises a hook; wherein the predetermined geometry of said hook includes an inclined edge and a restraining edge; and wherein the inclined edge is engaged by the housing of said electrical apparatus to pivot said latch toward the unlatched position.

15. The switchgear system of claim 14 wherein the intermediate portion of said latch includes a recess; wherein the predetermined geometry of the first end of said latch comprises an arcuate profile; wherein, responsive to said electrical apparatus being moved into said compartment toward a fully installed position, said arcuate profile engages the housing of said electrical apparatus to pivot said latch to the unlatched position; wherein, when said electrical apparatus is fully installed, said arcuate profile disengages the housing, thereby releasing said latch to return to the latched position; and wherein, when said electrical apparatus is fully installed and said latch is disposed in the latched position, said recess receives a portion of the housing of said electrical apparatus and said restraining edge of said hook engages the housing to restrain movement of said electrical apparatus.

16. The switchgear system of claim 12 wherein the first end of said latch includes a thru hole; wherein said first sidewall and said second sidewall each include an aperture; wherein said latch assembly further comprises a fastener assembly; wherein said number of biasing elements is a number of torsion springs each including a plurality of coils; wherein said fastener assembly includes an elongated pivot member; wherein said elongated pivot member extends through the aperture of said first sidewall, through said thru hole of said latch and said plurality of coils, and through said aperture of said second sidewall; and wherein said fastener assembly fastens said elongated pivot member to said first sidewall and said second sidewall.

17. The switchgear system of claim 16 wherein said number of torsion springs is first torsion spring and a second torsion spring; wherein said first torsion spring is disposed between said latch and said first sidewall; wherein said second torsion spring is disposed between said latch and said second sidewall; wherein each of said first torsion spring and said second torsion spring includes a first leg and a second leg; wherein said first leg cooperates with the base of said U-shaped bracket; and wherein the second leg cooperates with said latch.

18. The switchgear system of claim 11 wherein said compartment includes a base plate; and wherein said at least one latch assembly is coupled to said base plate.

19. The switchgear system of claim 18 wherein said at least one latch assembly is a first latch assembly and a second latch assembly.

20. The switchgear system of claim 10 wherein said at least one latch assembly is a first latch assembly and a second latch assembly; wherein said housing comprises a first end portion and a second end portion; and wherein said latch of said first latch assembly and said latch of said second latch assembly are each disposed between said first end portion and said second end portion.

* * * * *